US009118222B2

(12) United States Patent
Okamura

(10) Patent No.: US 9,118,222 B2
(45) Date of Patent: Aug. 25, 2015

(54) OUTER ROTOR-TYPE BRUSHLESS MOTOR

(71) Applicant: Shinano Kenshi Kabushiki Kaisha, Ueda-shi, Nagano (JP)

(72) Inventor: Fumihiro Okamura, Ueda (JP)

(73) Assignee: SHINANO KENSHI KABUSHIKI KAISHA, Ueda-shi (JP)

(*) Notice: Subject to any disclaimer, the term of this patent is extended or adjusted under 35 U.S.C. 154(b) by 339 days.

(21) Appl. No.: 13/739,160

(22) Filed: Jan. 11, 2013

(65) Prior Publication Data

US 2013/0221783 A1    Aug. 29, 2013

(30) Foreign Application Priority Data

Feb. 24, 2012    (JP) ................ 2012-039006

(51) Int. Cl.
*H02K 7/00* (2006.01)
*H02K 7/08* (2006.01)
*H02K 1/27* (2006.01)
*H02K 5/16* (2006.01)

(52) U.S. Cl.
CPC ............. *H02K 7/08* (2013.01); *H02K 1/2786* (2013.01); *H02K 5/16* (2013.01)

(58) Field of Classification Search
None
See application file for complete search history.

(56) References Cited

U.S. PATENT DOCUMENTS

| 5,216,557 | A | * | 6/1993 | Elsaesser et al. | 360/99.08 |
| 5,446,610 | A | * | 8/1995 | Elsaesser et al. | 310/67 R |
| 5,747,908 | A | * | 5/1998 | Saneshige et al. | 310/91 |
| 5,949,164 | A | * | 9/1999 | Cap et al. | 310/67 R |
| 2012/0033329 | A1 | * | 2/2012 | Mizukami et al. | 360/99.08 |

FOREIGN PATENT DOCUMENTS

| JP | 07-015907 A | 1/1995 |
| JP | 2007-247663 A | 9/2007 |
| JP | 2008-312286 A | 12/2008 |

* cited by examiner

*Primary Examiner* — Tran Nguyen
(74) *Attorney, Agent, or Firm* — Westerman, Hattori, Daniels & Adrian, LLP

(57) ABSTRACT

The outer rotor-type blushless motor comprises: a stator including a cylindrical housing, a stator core having stator pole teeth and a bearing coaxially incorporated in a cylindrical hole of the hosing; and a rotor including a rotor yoke, a rotor hub provided to the rotor yoke and a rotor shaft rotatably supported by the bearing. A first resin washer, through which the rotor shaft is pierced and which contacts an end face of the rotor hub, and a second resin washer, which contacts an end face of the bearing incorporated in a center hole of the stator core, contact each other. The second resin washer has an elastic projected section fitted in a concave section formed in the center hole of the stator core.

3 Claims, 2 Drawing Sheets

OUTER ROTOR-TYPE BRUSHLESS MOTOR

CROSS-REFERENCE TO RELATED APPLICATION

This application is based upon and claims the benefit of priority of the prior Japanese Patent Application No. P2012-039006, filed on Feb. 24 2012, and the entire contents of which are incorporated herein by reference.

FIELD

The present invention relates to an outer rotor-type brushless motor used in office automation equipments, home electric appliances, industrial machines, etc.

BACKGROUND

A conventional outer rotor-type DC brushless motor will be explained with reference to FIGS. 3A-4.

Firstly, a structure of a stator 50 will be explained with reference to FIG. 3A. An oil-impregnated sintered bearing 52, which is formed into a cylindrical shape, is coaxially provided in a center hole 51a of a cylindrical housing 51. A stator core 53, in which a plurality of pole teeth 53a are radially outwardly extended and coils 54 are respectively formed on the pole teeth 53a, is attached on an outer circumferential face of one end part of the housing 51. In the stator core 53, each of the coils 54 is formed by winding a copper wire on each of the pole teeth 53a coated with and electrically insulated by a resin film. A mounting plate 55 is fixed on the outer circumferential face of the other end part of the housing 51 by press fit or caulking. A motor driving circuit board 56 is provided on the mounting plate 55. A sensor (not shown) including a Hall element is mounted on the mounting plate 56.

Next, a structure of a rotor 57 will be explained with reference to FIG. 3A. One end part of a rotor shaft 58 is fixed to a rotor hub 59, which is formed by pressing a metal plate, e.g., brass plate, by press fit. A rotor yoke 60, which is formed into a cup shape, is integrally attached to the rotor hub 59 by caulking. A ring magnet 61, in which a plurality of magnetic poles are arranged in the circumferential direction, is fixed on an inner circumferential face of the rotor yoke 60. After assembling the stator 50, the rotor shaft 58 of the rotor 57 is inserted into the oil-impregnated sintered bearing 52. The pole teeth 53a and the magnet 61 are faced each other. Since the rotor shaft 58 is rotatably supported by the oil-impregnated sintered bearing 52, the rotor 57 can be rotated with respect to the housing 51.

Since the rotor shaft 58 of the rotor 57 is supported by the oil-impregnated sintered bearing 52 incorporated in the center hole 51a of the housing 51, a vertical load of the rotor 57 is received by a pair of metal or resin washers, or a combination of a metal washer and a resin washer, which are provided between the rotor hub 59 and the oil-impregnated sintered bearing 52.

For example, as shown in FIG. 3B, a first resin washer 62 is provided on an end face of the rotor hub 59, and a second resin washer 63 is provided on an end face of the oil-impregnated sintered bearing 52. With this structure, directly sliding the end face of the rotor hub 59 on the end face of the oil-impregnated sintered bearing 52 can be avoided. The first resin washer 62 and the second resin washer 63 are ring-shaped resin washers having high slidability and high abrasion resistance. Therefore, the first resin washer 62 and the second resin washer 63 slide on each other while rotating the rotor 57, so that abrasion of the oil-impregnated sintered bearing 52 can be prevented (see Japanese Laid-open Patent Publications No. 7-15907, No. 2007-247663 and No. 2008-312286).

However, the first resin washer 62 shown in FIG. 3B is press-fitted to the rotor shaft 58 and placed on the lower end face of the rotor hub 58. On the other hand, the second resin washer 63, whose outer diameter is smaller than an inner diameter of the center hole of the housing 51, is inserted in the center hole and placed on the upper end face of the oil-impregnated sintered bearing 52.

With this structure, in some cases, the first resin washer 62 is rotated together with the second resin washer 63 by the rotation of the rotor 57. Especially, the first resin washer 62 and the second resin washer 63 will be stuck on each other by surface tension of oil included in the oil-impregnated sintered bearing 52, so the first resin washer 62 and the second resin washer 63 will be easily integrally rotated. By integrally rotating the first resin washer 62 and the second resin washer 63, the second resin washer 63 slides on the end face of the oil-impregnated sintered bearing 52, and an outer circumferential face of the second resin washer 63 slides on an inner circumferential face of the housing 51. Therefore, sludge or abrasion powders, which are formed by the sliding actions, invade into the center hole of the housing 51, so the rotor shaft 58 will be abraded and decentered and a span of life of the oil-impregnated sintered bearing 52 will be shortened.

Note that, in the conventional technology disclosed in said Japanese Laid-open Patent Publications No. 7-15907, No. 2007-247663 and No. 2008-312286, two or more washers are stuck, on the bearing, in the thrust direction. Therefore, number of parts must be increased, a production cost must be increased and assembling efficiency must be lowered.

In case that the second resin washer 63 is a ring-shaped washer having two projected sections 63a and that concave sections 51a facing the projected sections 63a are formed in an inner wall of the housing 51 as shown in FIG. 4, the integrated rotation of the first and second ring washers 62 and 63 can be prevented. However, the inner wall of the housing 51 must be cut, so a production cost must be increased.

Further, the second resin washer 63 is formed into the non-circular shape. Therefore, in case that the second resin washer 63 is detached from the center hole of the housing 51 by surface tension of the lubricant oil when the rotor 57 is lifted in the axial direction by an external load or a treatment in an examination step, the second resin washer 63 cannot always correctly fitted into the center hole of the housing 51. Therefore, there is a possibility that the projected sections 63a of the second resin washer 63 are not fitted into the concave sections 51a of the housing 51. If the projected sections 63a are not fitted into the concave sections 51a, abrasion of the bearing 52 cannot be prevented.

SUMMARY

Accordingly, it is an object to provide an outer rotor-type brushless motor capable of solving the above described problems of the conventional technologies. Namely, the outer rotor-type brushless motor of the present invention is capable preventing integrated rotation of resin washers, which are provided between a rotor hub and a bearing, and improving durability of the bearing.

To achieve the object, the present invention has following structures.

Namely, the outer rotor-type blushless motor of the present invention comprises:

a stator including a cylindrical housing having a cylindrical hole, a stator core, in which coils are formed on stator pole teeth, being attached to one end of the housing, and a bearing being coaxially incorporated in the cylindrical hole of the hosing; and a rotor including a rotor yoke having a magnet facing the stator pole teeth, a rotor hub being provided to the center of the rotor yoke, and a rotor shaft being connected to the rotor hub and rotatably supported by the bearing, the rotor is assembled to the stator in a state where a first resin washer, through which the rotor shaft is pierced and which contacts an end face of the rotor hub, and a second resin washer, which contacts an end face of the bearing incorporated in a center hole of the stator core, contact each other, and the second resin washer has an elastic projected section and is retained by fitting the projected section into a concave section formed in an inner wall of the center hole of the stator core.

In this outer rotor-type brushless motor, the second resin washer has the elastic projected section, and the second resin washer is retained by fitting the projected section into the concave section formed in the inner wall of the center hole of the stator core. Therefore, even if the first resin washer attached to the rotor shaft is rotated by the rotation of the rotor, integral rotation of the first resin washer and the second resin washer which slides on the first resin washer can be prevented. By preventing the integral rotation of the first and second resin washers, no sludge or no abrasion powders are formed between the second resin washer and the end face of the bearing, so that durability of the bearing can be improved.

Note that, in case that the stator core is formed by stacking silicon steel plates, the concave section formed in the inner wall of the stator core and the pole teeth of the stator core can be simultaneously formed by press working. Therefore, no special process is required, and increasing a production cost can be restrained. The housing is composed of a relatively expensive material, e.g., brass. Further, in the conventional motor, the second resin washer is attached to the housing. On the other hand, in the present invention, the second resin washer is attached to the stator core, so that a size of the housing, in the axial direction, can be smaller and the production cost can be reduced.

Preferably, a slit is radially formed in the projected section of the second resin washer so as to divide the projected section into a plurality of divided sections, and the divided sections are elastically fitted in the concave section of the stator core so as to prohibit the second resin washer to move in the circumferential direction and the axial direction.

With this structure, the second resin washer can be strongly and correctly positioned in the circumferential direction and the axial direction with respect to the stator core. Therefore, even if the rotor is moved in the axial direction, by an external load, etc., in a state where the second resin washer, which contacts the end face of the bearing, is stuck on the first resin washer by surface tension of lubricant oil, the second resin washer can be securely retained in the center hole of the stator core and shock resistance can be improved.

Preferably, a plurality of projections, which contact the inner wall of the center hole of the stator core at a plurality of places, are formed in an outer circumferential face of the second resin washer.

With this structure, the second resin washer, which is coaxially fitted on the rotor shaft, and the stator core can be easily coaxially arranged, so that assembling efficiency of them can be improved, uneven abrasion of the rotor shaft can be prevented, and the rotation of the rotor can be stabilized.

In the outer rotor-type brushless motor of the present invention, integrated rotation of the resin washers, which are provided between the rotor hub and the bearing, can be prevented, and durability of the bearing can be improved. Further, a size of the housing, in the axial direction, can be smaller, so that the production cost of the motor can be reduced.

BRIEF DESCRIPTION OF THE DRAWINGS

Embodiments of the present invention will now be described by way of examples and with reference to the accompanying drawings, in which.

DETAILED DESCRIPTION OF THE EMBODIMENT

A preferred embodiment of the present invention will now be described in detail with reference to the accompanying drawings. In the following description, an outer rotor-type DC brushless motor will be explained as an embodiment of the outer rotor-type brushless motor of the present invention.

Figure 1A:
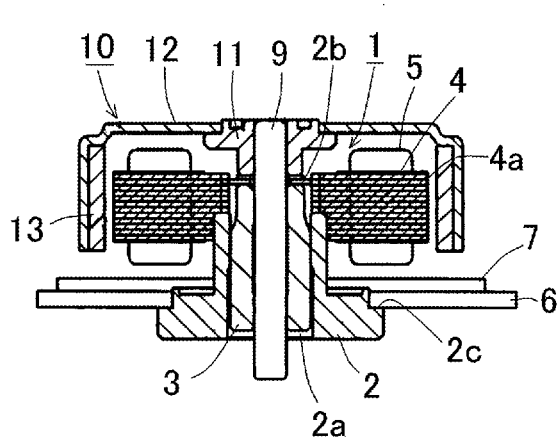
FIG. 1A is a sectional view of an embodiment of the outer rotor-type DC brushless motor of the present invention.
Figure 2A:
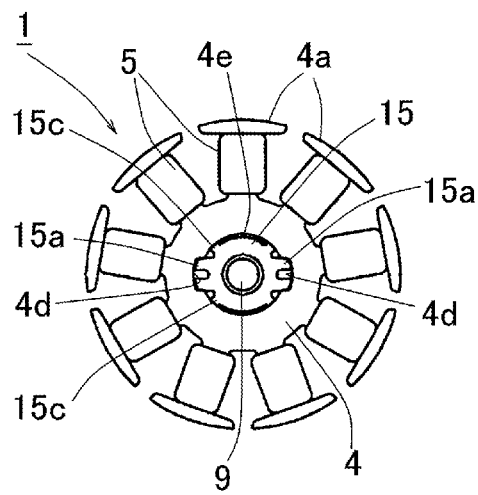
FIG. 2A is a plan view of a stator core and a second resin washer shown FIGS. 1A and 1B.

A structure of the outer rotor-type DC brushless motor will be explained with reference to FIG. 1A. In a stator 1, an oil-impregnated sintered bearing 3 is coaxially incorporated in a center hole 2a of a cylindrical housing 2. A stator core 4 is fixed to one end part 2b of the housing 2, by an adhesive agent, in a state where a step-shaped section 4b, which is formed in a center hole 4e of the stator core 4, contacts an end face and an outer circumferential face of the one end part 2b. The stator core 4 is a stacked core, and pole teeth 4a are radially extended from an outer circumferential face of the stator core 4 when viewed from above (see FIG. 2A). Coils 5 are respectively formed on the pole teeth 4a.

A step-shaped section 2c is formed in the other end part of the housing 2. A mounting plate 6 is fixed to the step-shaped section 2c by press fit or caulking. A motor driving circuit board 7 is fixed on the mounting plate 6. A sensor (not shown) including a Hall element is mounted on the motor driving circuit board 7.

A rotor 10 is rotatably supported by the oil-impregnated sintered bearing 3, which is inserted in the center hole 2a of the housing 2. A vertical load of the rotor 10 is received by a pair of resin washers 14 and 15, which are provided between a rotor hub 11 and the oil-impregnated sintered bearing 3.

Next, a structure of the rotor 10 will be explained with reference to FIG. 1A. The rotor hub 11, which is formed by pressing a metal plate, e.g., brass plate, is fixed to one end of a rotor shaft 9 by press fit. A cup-shaped rotor yoke 12 is integrated with the rotor hub 11 by caulking. The rotor yoke 12 is composed of a magnetic material. A ring-shaped magnet 13, in which a plurality of magnetic poles are alternately arranged in the circumferential direction, is fixed to an inner circumferential face of the rotor yoke 12. An axial length of the magnet 13 is longer than that of the pole teeth 4a of the stator core 4. After assembling the stator 1, the rotor 10 is incorporated into the stator 1 by inserting the rotor shaft 9 into the oil-impregnated sintered bearing 3. The magnet 13 of the rotor 10 and the pole teeth 4a, which face the magnet 13, magnetically work to each other. The rotor 10 is rotatably held by the oil-impregnated sintered bearing 3 and can be rotated with respect to the housing 2.

Figure 1B:
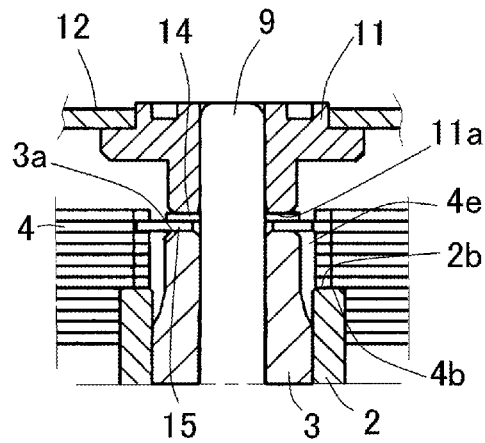
FIG. 1B is a partially enlarged sectional view of the outer rotor-type DC brushless motor.

As shown in FIG. 1B, the rotor shaft 9, which is connected to the rotor hub 11, pierces through the first resin washer 14 and contacts a lower end face 11a of the rotor hub 11. The second resin washer 15 is stacked onto an upper end face 3a of the oil-impregnated sintered bearing 3, which faces the first resin washer 14. By assembling the rotor 10 to the stator 1, the first resin washer 14 is stacked onto the second resin washer 15, so that the resin washers 14 and 15 receive a vertical load of the rotor 10. A pair of projected sections 15a, which can be respectively fitted into a pair of concave sections 4d formed in an inner wall 4c of the stator 4, are formed in an outer periphery of the second resin washer 15. The projected sections 15a can be elastically deformed. A width of each of the projected sections 15a is wider than a distance between inner side faces 4f of each of the concave sections 4d (see FIG. 2B).

Preferably, the first and second resin washers 14 and 15 are, for example, poly washers, which have high slidability and high durability and which are produced by punching out a high slide tape, in which graphite particles are dispersed in nylon resin, and formed into a ring shape. The shape of the second resin washer 15 is not a true circular shape, so that the second resin washer 15 is prohibited to rotate with respect to the stator core 4 and securely retained in the stator core 4. Therefore, an outside dimension of the second resin washer 15 is larger than that of the first resin washer 14.

With the above described structure, even if the first resin washer 14, which is attached to the rotor shaft 9, is rotated by the rotation of the rotor 10, integral rotation of the first and second resin washers 14 and 15 can be prevented. Therefore, the second resin washer 15 and the upper end face 3a of the oil-impregnated sintered bearing 3 are not frictioned, so that no sludge or no abrasion powders are formed therebetween and durability of the oil-impregnated sintered bearing 3 can be improved.

Note that, no step-shaped parts and no edges are formed in the surface of the second resin washer 15 which contacts the rotating first resin washer 14, so that the rotor 10 can be smoothly rotated without generating vibration. Further, the stator core 4 is the stacked core formed by stacking silicon steel plates, so the concave sections 4d formed in the inner wall 4c of the stator 4 and the pole teeth 4a thereof (see FIG. 2A) can be simultaneously formed by pressing the silicon steel plates. Therefore, no special process is required, and increasing a production cost can be restrained.

Figure 2B:
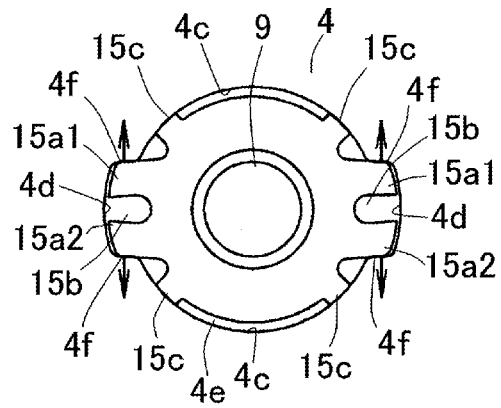
FIG. 2B is a partially enlarged plan view of the second resin washer in the stator core.
Figure 3A:
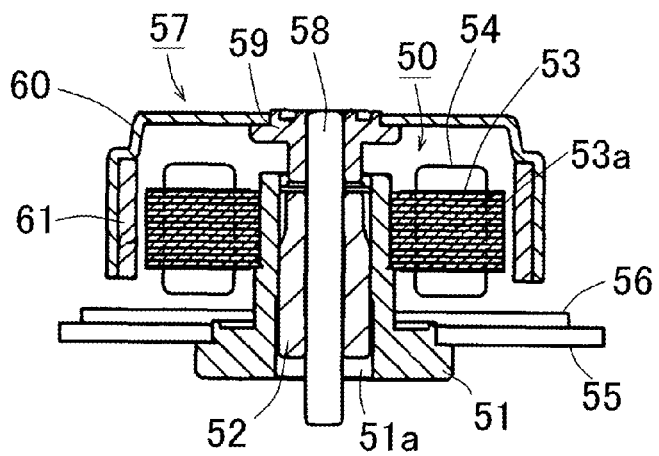
FIG. 3A is a sectional view of the conventional outer rotor-type DC brushless motor.
Figure 3B:
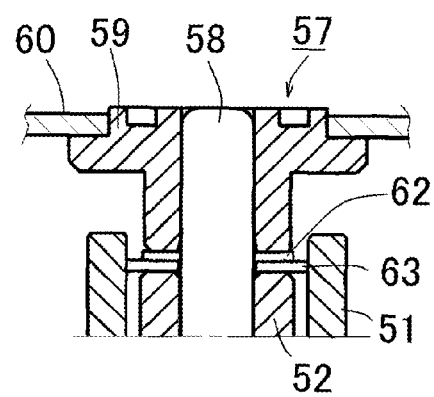
FIG. 3B is a partially enlarged sectional view of the conventional outer rotor-type DC brushless motor.
Figure 4:
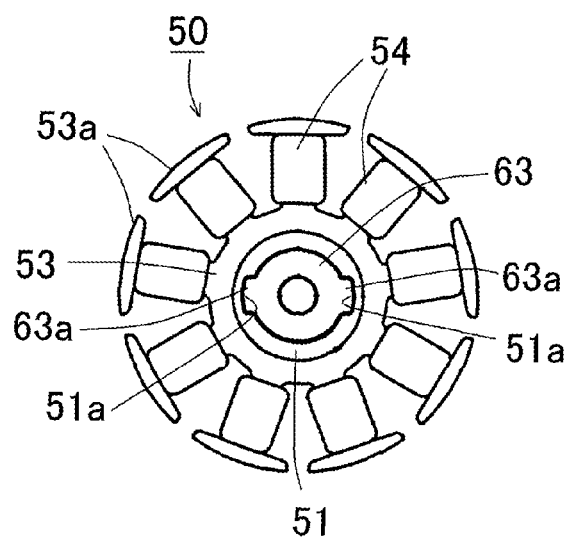
FIG. 4 is a plan view of the second resin washer in the stator core of the conventional outer rotor-type brushless motor.

As shown in FIG. 2B, a slit 15b is radially formed in each of the projected sections 15a of the second resin washer 15. By forming the slit 15b, each of the projected sections 15a is divided into two divided sections 15a1 and 15a2. The divided sections 15a1 and 15a2 are fitted into each of the concave sections 4d. By fitting the divided sections 15a1 and 15a2 into each of the concave sections 4d, the divided sections 15a1 and 15a2 elastically engage with the inner side faces 4f of each of the concave sections 4d, so that the second resin washer 15 is prohibited to rotate and securely retained in the stator core 4.

With the above described structure, the second resin washer 15 can be strongly and correctly positioned in the circumferential direction and the axial direction with respect to the stator core 4. Therefore, even if the rotor 10 is moved in the axial direction, by an external load, etc., in a state where the second resin washer 15, which contacts the end face of the oil-impregnated sintered bearing 3, is stuck on the first resin washer 14 by surface tension of lubricant oil, the second resin washer 15 can be securely retained in the center hole 4e of the stator core 4 and shock resistance can be improved.

Further, as shown in FIG. 2B, a plurality of projections (e.g., four projections) 15c, which contact the inner wall 4c of the center hole 4e of the stator core 4 at a plurality of places (e.g., at four places), are projected from the outer circumferential face of the second resin washer 15.

By forming the projections 15c, the second resin washer 15, which is coaxially fitted on the rotor shaft 9, and the stator core 4 can be easily coaxially arranged, so that assembling efficiency of them can be improved, uneven abrasion of the rotor shaft 9 can be prevented and the rotation of the rotor 10 can be stabilized.

Note that, number of the places at each of which the projected section 15a of the second resin washer 15 is fitted in the concave section 4d of the stator core 4 is not limited to two. The number may be three or more. Number of the projections 15c projected from the outer circumferential face of the second resin washer 15 is not limited to four. The number may be five or more.

Further, the outer rotor-type DC brushless motor of the present embodiment may be applied to office automation equipments, home electric appliances, industrial machines, etc. as a driving source.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alternations could be made hereto without departing from the spirit and scope of the invention.

What is claimed is:

1. An outer rotor-type blushless motor, comprising:
a stator including a cylindrical housing having a cylindrical hole, a stator core attached to one end of the housing, and a bearing coaxially incorporated in the cylindrical hole of the hosing, the stator core having stator pole teeth and coils formed on the stator pole teeth; and
a rotor including a rotor yoke having a magnet facing the stator pole teeth, a rotor hub being provided to the center of the rotor yoke, and a rotor shaft being connected to the rotor hub and rotatably supported by the bearing,
wherein the rotor is assembled to the stator in a state where a first resin washer and a second resin washer contact each other, the first resin washer contacts an end face of the rotor hub, the second resin washer contacts an end face of the bearing incorporated in a center hole of the stator core, and the rotor shaft pierces through the first resin washer, and
wherein the second resin washer has an elastic projected section and is retained by fitting the projected section into a concave section formed in an inner wall of the center hole of the stator core.

2. The outer rotor-type blushless motor according to claim 1,
wherein a slit is radially formed in the projected section of the second resin washer so as to divide the projected section into a plurality of divided sections, and the divided sections are elastically fitted in the concave section of the stator core so as to prohibit the second resin washer to move in the circumferential direction and the axial direction.

3. The outer rotor-type blushless motor according to claim 1,
wherein a plurality of projections contact the inner wall of the center hole of the stator core at a plurality of places and are projected from an outer circumferential face of the second resin washer.

* * * * *